Dec. 18, 1923.
R. D'ANTONIO
1,477,544
PROPELLING MECHANISM IN PEDICYCLES
Filed July 14, 1922
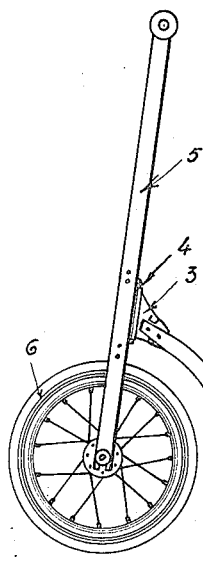
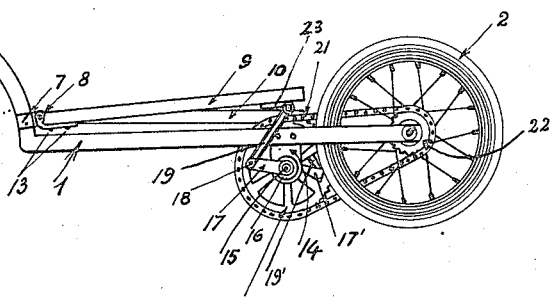
Fig. 1
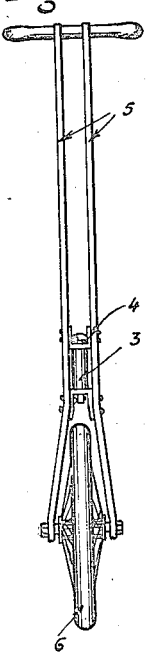
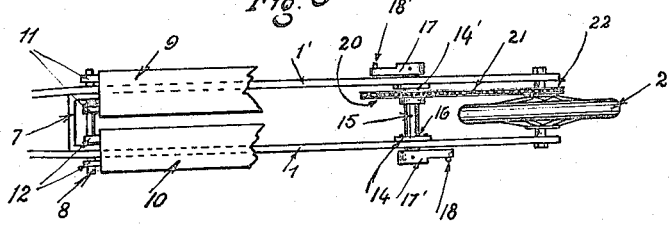
Fig. 2
Fig. 3
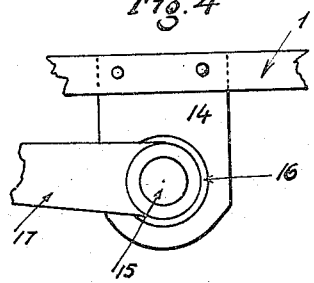
Fig. 4
Inventor
Remigius D'Antonio Patented Dec. 18, 1923.

1,477,544

UNITED STATES PATENT OFFICE.

REMIGIUS D'ANTONIO, OF NEW YORK, N. Y.

PROPELLING MECHANISM IN PEDICYCLES.

Application filed July 14, 1922. Serial No. 575,094.

*To all whom it may concern:*

Be it known that I, REMIGIUS D'ANTONIO, a subject of the King of Italy, and a resident of the city of New York, borough of Bronx, county and State of New York, have invented a new and Improved Propelling Mechanism in Pedicycles, of which the following is a full and exact description.

The invention relates to improvements made in a pedi-cycle and has for an object to provide the same of a simple and useful mechanism properly adapted to produce an effective propelling power and speed by means of an alternating movement of the feet and of two parallel horizontal pivoted boards.

In the accompanying drawings—Fig. 1 is a side elevation of the entire pedi-cycle, showing the appliance of the new mechanism. Fig. 2 is a front view of the pedicycle. Fig. 3 is a detailed top view of the propelling mechanism, as it appears after the removal of the two pedals. Fig. 4 is a detail of the bracket which supports the shaft of the pedals.

Referring to the accompanying drawings, the numerals 1, 1' indicate the main frame which on one end carries the rear-wheel 2, and on the other has solidly fastened a cross-head 3, provided with a hole and pin 4, by means of which the frame 5, for the steering-wheel 6 can be properly turned.

The U-shaped bracket 7, is firmly riveted on both sides to the branches of the frame 1, 1' and supports the shaft 8, on which, the pedal boards 9, 10, are suitably pivoted by means of hinges 11, 12, secured to the underside of the boards by wood screws 13.

Both brackets 14, 14' are also riveted on the frame 1, 1' and have fixed thereon annular ball bearings 16, through which passes the shaft 15, to reduce the friction. On both ends of the shaft 15 are fixed, in an opposite direction, for the rotary movement, the cranks 17, 17', which have their outer end provided with pin 18, 18'. The links 19, 19' have their lower ends pivoted on the pin of the corresponding crank, while the upper end of each link is bent at a right angle and pivots inside the hole of a hinge 23 screwed to the underside of each of the pedal boards 9, 10. To the shaft 15 is also fixed the sprocket 20. An endless chain 21 engages, at the same time, with the teeth of both sprockets 20 and 22, the latter being mounted on the hub of the back-wheel 2.

In this way any up and downward movement of the pedals 9, 10, is transformed in a continuous rotary movement of the rear wheel of the pedi-cycle.

What I claim is:

A vehicle comprising a substantially horizontally disposed frame, relatively close oppositely disposed bars carried by said frame and horizontally disposed, a driving wheel rotatably mounted between the rear ends of the bars, a transversely disposed drive shaft rotatably mounted on the bars forwardly of the driving wheel, driving connections between said wheel, the driving wheel, the forward shaft and the driving wheel, the forward ends of the bars curving upwardly and forwardly and merging together, a transversely disposed shaft extending through the bars adjacent their forward ends and on the curved portion thereof, depressible members disposed above the rear portion of the bars and pivoted to said last named shaft, crank connections between the rear ends of the depressible members and the drive shaft, whereby when one depressible member is in raised position the other depressible member is in lowered position, a guide wheel, a steering post carried by said guide wheel, said steering post being pivotally connected to the forward end of the curved portion of the frame.

REMIGIUS D'ANTONIO.